(12) United States Patent
Kimba Dit Adamou et al.

(10) Patent No.: US 11,382,160 B2
(45) Date of Patent: Jul. 5, 2022

(54) METHOD OF PROCESSING RADIO LINK FAILURE, USER TERMINAL AND NETWORK DEVICE

(71) Applicant: VIVO MOBILE COMMUNICATION CO., LTD., Chang'an Dongguan (CN)

(72) Inventors: Boubacar Kimba Dit Adamou, Chang'an Dongguan (CN); Xiaodong Yang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 36 days.

(21) Appl. No.: 16/960,238

(22) PCT Filed: Jan. 4, 2019

(86) PCT No.: PCT/CN2019/070369
§ 371 (c)(1),
(2) Date: Jul. 6, 2020

(87) PCT Pub. No.: WO2019/134669
PCT Pub. Date: Jul. 11, 2019

(65) Prior Publication Data
US 2021/0068185 A1    Mar. 4, 2021

(30) Foreign Application Priority Data
Jan. 8, 2018 (CN) .......................... 201810016067.2

(51) Int. Cl.
*H04W 76/18* (2018.01)
*H04W 24/02* (2009.01)

(52) U.S. Cl.
CPC .......... *H04W 76/18* (2018.02); *H04W 24/02* (2013.01)

(58) Field of Classification Search
CPC .............................. H04W 24/02; H04W 76/18
USPC ......................................................... 370/216
See application file for complete search history.

(56) References Cited

U.S. PATENT DOCUMENTS

| | | | |
|---|---|---|---|
| 2011/0077010 A1 | 3/2011 | Xu et al. | |
| 2011/0300896 A1 | 12/2011 | Wang et al. | |
| 2014/0050102 A1* | 2/2014 | Lee | H04W 76/19 370/242 |
| 2014/0287756 A1 | 9/2014 | Yang | |

(Continued)

FOREIGN PATENT DOCUMENTS

| | | |
|---|---|---|
| CN | 102281572 A | 12/2011 |
| CN | 102348231 A | 2/2012 |

(Continued)

OTHER PUBLICATIONS

International Search Report & Written Opinion related to Application No. PCT/CN2019/070369; dated Jul. 23, 2020.

(Continued)

*Primary Examiner* — Gbemileke J Onamuti
(74) *Attorney, Agent, or Firm* — von Briesen & Roper, s.c.

(57) ABSTRACT

Embodiments of the present disclosure provide a method of processing radio link failure, a user terminal and a network device. The method includes: recording radio link failure information of a radio link failure that occurs in the user terminal; when the user terminal enters a connected state or an inactive state in a current cell, reporting the radio link failure information to a network device.

20 Claims, 4 Drawing Sheets

(56) References Cited

U.S. PATENT DOCUMENTS

| | | | | |
|---|---|---|---|---|
| 2014/0295825 A1* | 10/2014 | Chuang | ................ | H04W 76/19 |
| | | | | 455/425 |
| 2015/0133122 A1 | 5/2015 | Chen | | |
| 2015/0334607 A1* | 11/2015 | Singh | ............... | H04W 52/0206 |
| | | | | 455/437 |
| 2018/0192371 A1* | 7/2018 | Jung | ................... | H04B 7/0617 |
| 2019/0387420 A1 | 12/2019 | Li et al. | | |

FOREIGN PATENT DOCUMENTS

| | | |
|---|---|---|
| CN | 102932821 A | 2/2013 |
| CN | 103313275 A | 9/2013 |
| CN | 103828438 A | 5/2014 |
| CN | 104640232 A | 5/2015 |
| CN | 104936242 A | 9/2015 |
| CN | 105636111 A | 6/2016 |
| CN | 106454910 A | 2/2017 |
| WO | 2015042779 A1 | 4/2015 |
| WO | 2015176738 A1 | 11/2015 |

OTHER PUBLICATIONS

Chinese Office Action for related Chinese Application No. 201810016067.2; dated Apr. 26, 2020.
Chinese Office Action for related Chinese Application No. 201810016067.2; dated Nov. 30, 2020.
Hisilicon Huawei, "Harmonization of RRC Connection Control management procedures", Nov. 27, 2017-Dec. 1, 2017, 3GPP TSG-RAN WG2 #100, Reno, US.

* cited by examiner

METHOD OF PROCESSING RADIO LINK FAILURE, USER TERMINAL AND NETWORK DEVICE

CROSS-REFERENCE TO RELATED APPLICATION

The present application is the U.S. national phase of PCT Application No. PCT/CN2019/070369 filed on Jan. 4, 2019, which claims the benefit and priority of Chinese Patent Application No. 201810016067.2, filed on Jan. 8, 2018, which is incorporated herein by reference in its entirety.

TECHNICAL FIELD

The present disclosure relates to the field of communication technologies, and in particular to a method of processing radio link failure, a user terminal and a network device.

BACKGROUND

In actual application, a user terminal may experience a radio link failure, For example, a radio link failure caused by a poor network signal or a handover failure. The handover failure may be a too early handover, a too late handover, or a handover to a wrong cell. In addition, when a radio link failure occurs on a user terminal, it will affect communication performance of the user terminal and communication performance of the communication system. Thus, the communication performance of such communication system is relatively poor.

SUMMARY

Embodiments of the present disclosure provide a method of processing radio link failure, a user terminal and a network device, which can solve the problem that the communication performance of the communication system is poor.

In a first aspect, one embodiment of the present disclosure provides a method of processing radio link failure, which is applied to a user terminal, including: recording radio link failure information of a radio link failure that occurs in the user terminal; when the user terminal enters a connected state or an inactive state in a current cell, reporting the radio link failure information to a network device.

In a second aspect, one embodiment of the present disclosure provides a method of processing radio link failure, which is applied to a network device, including: receiving radio link failure information transmitted by a user terminal in a current cell; when the current cell is different from a cell where the radio link failure of the user terminal occurs, transmitting the radio link failure information to a network device of the cell where the radio link failure occurs.

In a third aspect, one embodiment of the present disclosure provides a user terminal including: a recording module used to record radio link failure information of a radio link failure that occurs in the user terminal; a reporting module used to report the radio link failure information to a network device when the user terminal enters a connected state or an inactive state in a current cell.

In a fourth aspect, one embodiment of the present disclosure provides a network device including: a receiving module used to receive radio link failure information transmitted by a user terminal in a current cell; a transmission module used to, when the current cell is different from a cell where the radio link failure of the user terminal occurs, transmit the radio link failure information to a network device of the cell where the radio link failure occurs.

In a fifth aspect, one embodiment of the present disclosure provides a user terminal including: a memory, a processor, and a computer program stored on the memory and executable on the processor; wherein when the computer program is executed by the processor, the processor is used to implement steps of the method of processing radio link failure at the user terminal according to some embodiments of the present disclosure.

In a sixth aspect, one embodiment of the present disclosure provides a network device including: a memory, a processor, and a computer program stored on the memory and executable on the processor; wherein when the computer program is executed by the processor, the processor is used to implement steps of the method of processing radio link failure at the network device according to some embodiments of the present disclosure.

In a seventh aspect, one embodiment of the present disclosure provides a computer readable storage medium including a computer program stored thereon; wherein when the computer program is executed by the processor, the processor is used to implement steps of the method of processing radio link failure at the user terminal according to some embodiments of the present disclosure, or, when the computer program is executed by the processor, the processor is used to implement steps of the method of processing radio link failure at the network device according to some embodiments of the present disclosure.

In an eighth aspect, one embodiment of the present disclosure provides a network device including: a processor, a transceiver, and a bus interface; wherein the processor and the transceiver are coupled with other by the bus interface; the transceiver is used to, under control of the processor, implement steps of the method of processing radio link failure at the network device according to some embodiments of the present disclosure.

Through the method of processing radio link failure according to the present disclosure, the technical solution of the present disclosure can enable the network device to obtain the radio link failure information, thereby optimizing the network according to the radio link failure information and then improving the communication performance of the communication system.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

The technical solutions in embodiments of the present disclosure will be described hereinafter in a clear and complete manner in conjunction with the drawings in the embodiments of the present disclosure. Obviously, the following embodiments are merely a part of, rather than all of, the embodiments of the present disclosure, and based on these embodiments, a person skilled in the art may obtain the other embodiments, which also fall within the scope of the present disclosure.

Figure 1:
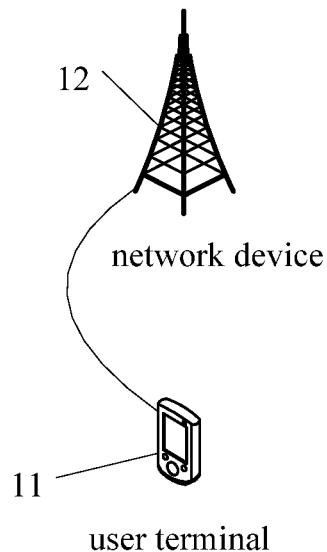
FIG. 1 is a schematic diagram of a system to which a method of processing radio link failure according to some embodiments of the present disclosure is applied.

Referring to FIG. 1, FIG. 1 is a schematic diagram of a system to which a method of processing radio link failure according to some embodiments of the present disclosure is applied. As shown in FIG. 1, the system includes a user terminal 11 and a network device 12. The user terminal 11 may be a user terminal (UE), for example, a mobile phone, a tablet personal computer, a laptop computer, a personal digital assistant (PDA), a mobile internet device (MID), a wearable device and other terminal devices. It should be noted that the specific type of the user terminal 11 is not limited in some embodiments of the present disclosure. The network device 12 may be a base station (for example, gNB, 5G NR NB) in the 5G network, or the network device 12 may be a base station (for example, eNB, eLTE NB) in the 4G network, or the network device 12 may be a network device in a WiFi network, or the network device 12 may be a network device in a Bluetooth network. In addition, in some embodiments of the present disclosure, the foregoing system may include a plurality of network devices in different networks, and the network devices in the different networks may communicate with each other, for example, transmitting radio link failure information. It should be noted that the specific type of the network device 12 is not limited in some embodiments of the present disclosure.

Figure 2:
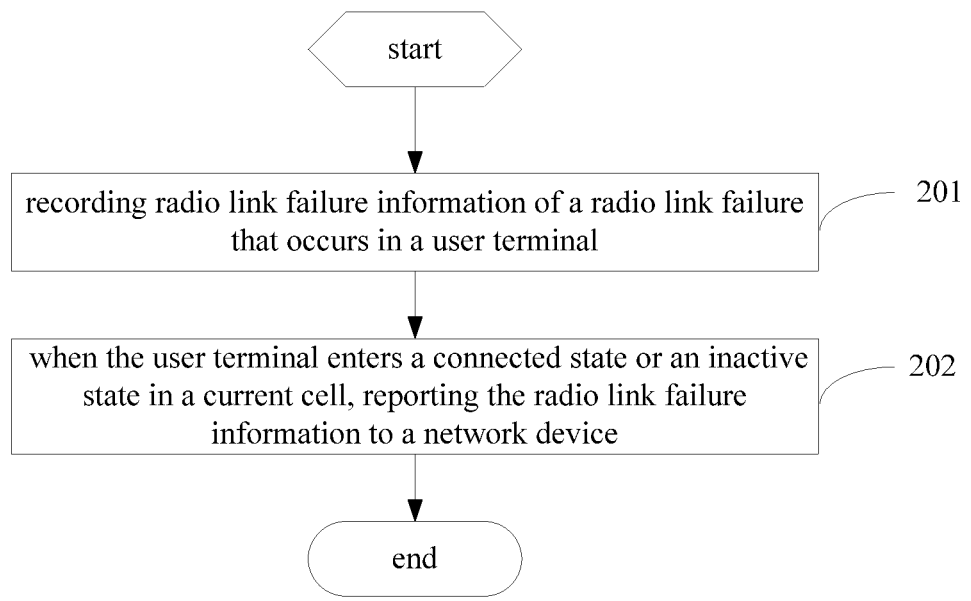
FIG. 2 is a flowchart of a method of processing radio link failure according to some embodiments of the present disclosure.

Referring to FIG. 2, FIG. 2 is a flowchart of a method of processing radio link failure according to some embodiments of the present disclosure. This method is applied to a user terminal. As shown in FIG. 2, the method includes the following steps 201-202.

Step 201: recording radio link failure information of a radio link failure that occurs in a user terminal.

In the step 201, the radio link failure information is recorded when the radio link failure occurs in the user terminal. The radio link failure information may be used to describe at least one of location, time, cell, power, signal strength, area, network slice of the radio link failure that occurs in the user terminal, which is not limited in some embodiments of the present disclosure.

Step 202: when the user terminal enters a connected state or an inactive state in a current cell, reporting the radio link failure information to a network device.

The above current cell may be a currently-entered cell, for example, a cell entered when the user terminal enters the connected state or the inactive state, and the cell may be a cell where the radio link failure of the user terminal occurs, or the above current cell may be a cell different from the cell where the radio link failure of the user terminal occurs, for examples, cells in different networks or different cells in the same network, which is not limited in some embodiments of the present disclosure.

The reporting the radio link failure information to a network device may include: reporting the radio link failure information to a network device of the current cell. In addition, after the network device receives the radio link failure information transmitted by the user terminal in the current cell, when the current cell is different from the cell where the radio link failure of the user terminal occurs, the network device may transmit the radio link failure information to a network device of the cell where the radio link failure of the user terminal occurs, for example, forwarding the radio link failure information, thereby enabling the network device of the cell where the radio link failure of the user terminal occurs to perform network optimization according to the radio link failure information to improve communication performance of the communication system, for example, adjusting transmission power, adjusting antenna arrays or adjusting cell coverage of the network device, which is not limited in some embodiments of the present disclosure.

When the current cell and the cell where the radio link failure of the user terminal occurs, are an identical cell, the network device of the current cell may perform network optimization according to the radio link failure information to improve the communication performance of the communication system.

Of course, it is not limited to report the radio link failure information to the network side device of the current cell. For example, the radio link failure information may be further reported to the network device of the cell where the radio link failure of the user terminal occurs, or other network devices, which is not limited in some embodiments of the present disclosure.

It should be noted that the above method may be applied to different communication networks, for example, the above method may be applied to at least one of 5G communication network, 4G communication network, WiFi network, and Bluetooth network. For example, the user terminal has a radio link failure in the WiFi network and then enters a connected state or an inactive state in the 5G communication network, then the radio link failure information may be reported to a network device of the 5G communication network. The network device of the 5G communication network forwards the radio link failure information to the network device of the WiFi network, so that the network device of the WiFi network can perform network optimization according to the radio link failure information. For another example, the user terminal has a radio link failure in the 4G communication network and then enters a connected state or an inactive state in the 5G communication network, then the radio link failure information may be reported to a network device of the 5G communication network. The network device of the 5G communication network forwards the radio link failure information to the network device of the 4G communication network, so that the network device of the 4G communication network can perform network optimization according to the radio link failure information. For another example, the user terminal has a radio link failure in a first cell of the 5G communication network and then enters a connected state or an inactive state in a second cell of the 5G communication network, then the radio link failure information may be reported to a network device of the second cell. The network device of the second cell forwards the radio link failure information to a network device of the first cell, so that the network device of the first cell can perform network optimization according to the radio link failure information.

In some embodiments of the present disclosure, by recording radio link failure information of the radio link failure that occurs in the user terminal and reporting the radio link failure information to the network device when the user terminal enters the connected state or the inactive state in the current cell, the network device can obtain the radio link failure information, so that the network device can perform network optimization according to the radio link failure information, thereby improving the communication performance of the communication system.

Figure 3:
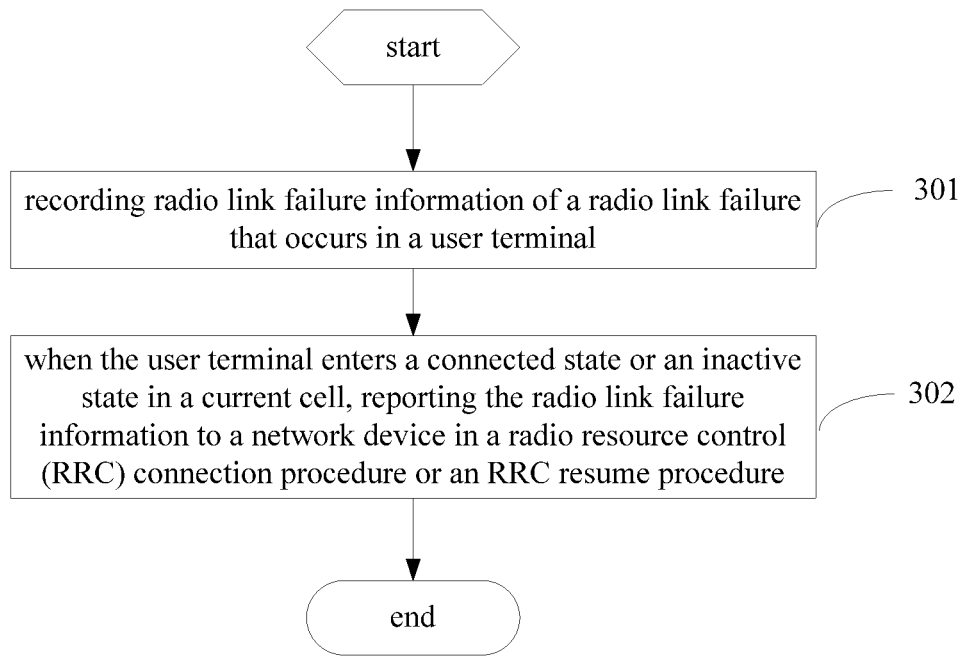
FIG. 3 is another flowchart of a method of processing radio link failure according to some embodiments of the present disclosure.

Referring to FIG. 3, FIG. 3 is another flowchart of a method of processing radio link failure according to some embodiments of the present disclosure. This method is applied to a user terminal. As shown in FIG. 3, the method includes the following steps 301-302.

Step 301: recording radio link failure information of a radio link failure that occurs in a user terminal.

Step 302: when the user terminal enters a connected state or an inactive state in a current cell, reporting the radio link failure information to a network device in a radio resource control (RRC) connection procedure or an RRC resume procedure.

The foregoing RRC connection procedure may be an RRC reestablishment connection procedure or a non-reestablished RRC connection procedure.

The reporting the radio link failure information to a network device in a radio resource control (RRC) connection procedure or an RRC resume procedure may include: transmitting the radio link failure information to the network device through an uplink message in the RRC connection procedure or the RRC resume procedure. For example, the radio link failure information is transmitted to the network device through the message MSG 1 or MSG3 in the RRC connection procedure or the RRC resume procedure.

Since the radio link failure information is reported to the network device during the RRC connection procedure or the RRC resume procedure, this can avoid transmission of the radio link failure information through additional messages, thereby saving transmission resources and power consumption of the user terminal and the network device. In addition, the radio link failure information can quickly be reported to the network device, thereby improving processing efficiency.

Of course, in some embodiments, the step 302 may be replaceable. For example, the step 302 may be replaced by: reporting the radio link failure information to the network device after the RRC connection procedure or the RRC resume procedure.

Through this step, the radio link failure information is reported to the network device after the connection is resumed. In this way, since the connection of the user terminal has been resumed, the stability in reporting the radio link failure information to the network device is better, thereby improving the accuracy of reporting the radio link failure information successfully.

In an optional implementation, the current cell and the cell where the radio link failure occurs, are an identical cell, or, the current cell and the cell where the radio link failure occurs, are different cells of the same network; or, the current cell and the cell where the radio link failure occurs, are cells of different networks.

When the current cell and the cell where the radio link failure occurs, are the identical cell, the radio link failure information is reported to a network device of the cell where the radio link failure occurs. In this way, the network device can directly perform network optimization on the cell according to the radio link failure information, thereby improving network optimization processing efficiency.

When the current cell and the cell where the radio link failure occurs, are different cells of the same network, the user terminal can report the radio link failure information to network devices of other cells in the same network. In this way, the radio link failure information can be forwarded between the network devices of the network, thereby achieving network optimization for the cell where the radio link failure occurs.

When the current cell and the cell where the radio link failure occurs, are cells of different networks, the user terminal can report the radio link failure information to network devices of different networks. In this way, the radio link failure information can be forwarded between the network devices of the different networks, thereby achieving network optimization for the cell where the radio link failure occurs.

When the current cell and the cell where the radio link failure occurs, are cells of different networks, the network device of the current cell may transmit in wired or wireless manner the radio link failure information to the network device of the cell where the radio link failure occurs. For example, the radio link failure information may be forwarded between a LTE base station and an NR base station, or a WiFi access point (AP), or Bluetooth AP. Specifically, there is a wired interface or a wireless interface between the LTE base station and the NR base station, or the WiFi AP, the Bluetooth AP. In addition, forwarding via the wireless interface includes multiple forwarding.

Of course, when the current cell and the cell where the radio link failure occurs, are cells of different networks, the network device of the current cell may transmit the radio link failure information to the network device of the cell where the radio link failure occurs, through a relay network device. For example, a network device that receives the radio link failure information reported by the user terminal, forwards through a third-party node (for example, an access network device or a core network device), the radio link failure information to the network device of the cell where the radio link failure of the user terminal occurs. For example, the LTE base station first forwards the radio link failure information to the NR base station, and then the NR base station forwards the radio link failure information to the WiFi AP; or, the LTE base station first forwards the radio link failure information to an NR core network node, and then the NR core network node forwards the radio link failure information to the NR base station or the Bluetooth AP. The core network node includes, but is not limited to, access and mobility management function (AMF), service management function (SMF) or user port function (UPF).

As an optional implementation, the radio link failure information includes at least one of cell identifier information, power information, measurement information, received signal strength indication (RSSI) information, basic service set (BSS) information, bluetooth beacon, location information, network slice information, time information and area information.

Through the above cell identifier information, the network device knows relevant cells where the radio link failure occurs, thereby optimizing these cells.

For example, the above cell identifier information may include: identifier information of a reporting cell. The reporting cell includes at least one of a cell where the radio link failure occurs, and a cell adjacent the cell where the radio link failure occurs.

In this way, through the above cell identifier information, the cell where the radio link failure occurs, and the cell adjacent the cell where the radio link failure occurs, can be reported to the network device, thereby facilitating the network optimization of these cells. In addition, the cell identifier information may be a physical cell identifier (PCI) of the cell, an evolved universal terrestrial radio access network cell global identifier (ECGI) or a basic service set identifier (BSSID).

Through the power information, the network device knows the power information of the user terminal when the radio link failure occurs, thereby facilitating the network optimization. For example, the above power information may include power headroom (PH).

Through the measurement information, the network device knows the relevant measurement information of the radio link failure, thereby facilitating the network optimization. For example, the measurement information may include at least one of measurement information of synchronization signal block (SS block) of the reporting cell, measurement information of channel condition information reference signal (CSI-RS), measurement information of tracking reference signal (TRS), and phase-tracking reference signal (PTRS). Through these measurement information, the network device can know more relevant measurement information of radio link failure, thereby improving the network optimization effect, enabling the network device to quickly determine the cause of the radio link failure and effectively discover the network coverage and vulnerability issues.

Through the above RSSI information, the network device can quickly determine the cause of the radio link failure and effectively discover the network coverage and vulnerability issues, thereby improving the network optimization effect. For example, the above RSSI information may include RSSI information of the reporting cell.

Through the above BSS, the network device can quickly determine the BSS information of the radio link failure and effectively discover the network coverage and vulnerability issues, thereby improving the network optimization effect. For example, the BSS information may include BSS information of the reporting cell.

Through the location information, the network device can quickly determine the location of the radio link failure and effectively discover the network coverage and vulnerability issues, thereby improving the network optimization effect. For example, the location information may include: location information where a radio link failure occurs. Of course, the location information may be positioning information.

Through the network slice information, the network device can quickly determine the network slice of the radio link failure and effectively discover the network coverage and vulnerability issues, thereby improving the network optimization effect. For example, the network slice information may include information of network slice in which a radio link failure occurs.

Through the time information, the network device can quickly determine the time of the radio link failure and effectively discover the network coverage and vulnerability issues, thereby improving the network optimization effect. For example, the time information may include at least one of time information of radio link failure and time information of resuming radio link.

Through the area information, the network device can quickly determine the area information of the radio link failure and effectively discover the network coverage and vulnerability issues, thereby improving the network optimization effect. For example, the area information may include at least one of RAN notification area (RNA) information, RAN paging area (RPA) information, RAN location area (RLA) information, system information area information and core network tracking area information.

Further, the measurement information of the SS block may include at least one of signal to interference plus noise ratio (SINR) of the SS block, reference signal receiving power (RSRP), reference signal receiving quality (RSRQ), measurement information of primary synchronization signal (PSS), measurement information of secondary synchronization signal (SSS) and measurement information of physical broadcast channel (PBCH).

The measurement information of CSI-RS includes at least one of SINR, RSRP and RSRQ of the CSI-RS.

In one implementation, the measurement information may allow the network device to quickly determine the cause of the radio link failure, thereby optimizing the network efficiently.

Further, the measurement information of the PSS may include: beam information of the PSS.

The measurement information of the SSS includes beam information of the SSS.

The measurement information of the PBCH includes at least one of demodulation reference signal (DMRS) measurement information and beam information of the PBCH.

The beam information may be a beam time index or a beam index, which is not limited in some embodiments of the present disclosure.

In one implementation, since the beam information and the DMRS measurement information are reported, this makes it easier for the network device to quickly determine the cause of the radio link failure, thereby optimizing the network efficiently.

In some embodiments, a plurality of optional implementation manners are provided on the basis of the embodiment shown in FIG. 1, so that the network device can effectively and quickly determine the location and cause of the radio link failure, thereby effectively discovering network coverage and vulnerability issues, and then performing network optimization to improve the communication performance of the communication system.

Figure 4:
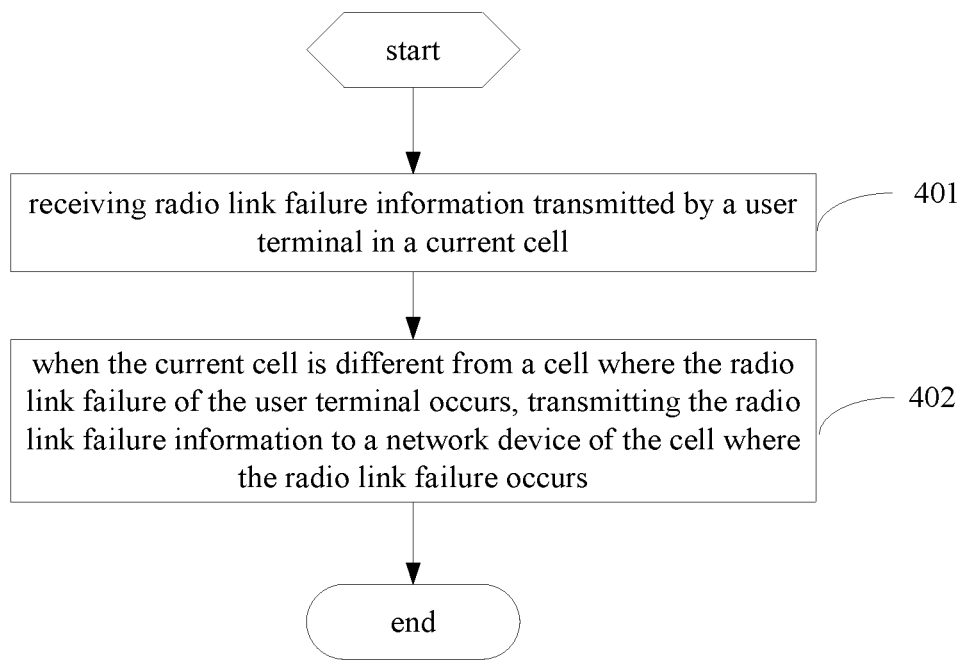
FIG. 4 is still another flowchart of a method of processing radio link failure according to some embodiments of the present disclosure.

Referring to FIG. 4, FIG. 4 is another flowchart of a method of processing radio link failure according to some embodiments of the present disclosure. This method is applied to a network device. As shown in FIG. 4, the method includes the following steps:

Step 401: receiving radio link failure information transmitted by a user terminal in a current cell;

Step 402: when the current cell is different from a cell where the radio link failure of the user terminal occurs, transmitting the radio link failure information to a network device of the cell where the radio link failure occurs.

Optionally, the receiving radio link failure information transmitted by a user terminal in a current cell, includes:

receiving the radio link failure information transmitted by the user terminal in an RRC connection procedure or an RRC resume procedure of the user terminal; or, receiving the radio link failure information transmitted by the user terminal after the RRC connection procedure or the RRC resume procedure.

The RRC connection procedure or the RRC resume procedure may be an RRC connection procedure or an RRC resume procedure of the user terminal in the current cell.

Optionally, the current cell and the cell where the radio link failure occurs, are different cells of the same network; or, the current cell and the cell where the radio link failure occurs, are cells of different networks.

Optionally, the transmitting the radio link failure information to a network device of the cell where the radio link failure occurs, includes:

transmitting in wired or wireless manner, the radio link failure information to the network device of the cell where the radio link failure occurs; or, transmitting through a relay network device, the radio link failure information to the network device of the cell where the radio link failure occurs.

Optionally, the radio link failure information includes at least one of cell identifier information, power information, measurement information, received signal strength indication (RSSI) information, basic service set (BSS) information, bluetooth beacon, location information, network slice information, time information and area information.

Optionally, the cell identifier information includes: identifier information of a reporting cell. The reporting cell includes at least one of a cell where the radio link failure occurs, and a cell adjacent the cell where the radio link failure occurs.

The power information includes power headroom (PH).

The measurement information includes at least one of measurement information of synchronization signal block (SS block) of the reporting cell, measurement information of channel condition information reference signal (CSI-RS), measurement information of tracking reference signal (TRS), and phase-tracking reference signal (PTRS).

The RSSI information includes RSSI information of the reporting cell.

The BSS information includes BSS information of the reporting cell.

The location information includes location information where a radio link failure occurs.

The network slice information includes information of network slice in which a radio link failure occurs.

The time information includes at least one of time information of radio link failure and time information of resuming radio link.

The area information includes at least one of RAN notification area (RNA) information, RAN paging area (RPA) information, RAN location area (RLA) information, system information area information and core network tracking area information.

Optionally, the measurement information of the SS block may include at least one of signal to interference plus noise ratio (SINR) of the SS block, reference signal receiving power (RSRP), reference signal receiving quality (RSRQ), measurement information of primary synchronization signal (PSS), measurement information of secondary synchronization signal (SSS) and measurement information of physical broadcast channel (PBCH).

The measurement information of CSI-RS includes at least one of SINR, RSRP and RSRQ of the CSI-RS.

Optionally, the measurement information of the PSS may include: beam information of the PSS.

The measurement information of the SSS includes beam information of the SSS.

The measurement information of the PBCH includes at least one of demodulation reference signal (DMRS) measurement information and beam information of the PBCH.

It should be noted that this embodiment is an embodiment of the network device corresponding to the embodiment shown in FIG. 2 to FIG. 3, specific implementation thereof may refer to the related description of the implementation shown in FIG. 2 to FIG. 3, and the same beneficial effects can be achieved, which will not be elaborated herein.

Figure 5:
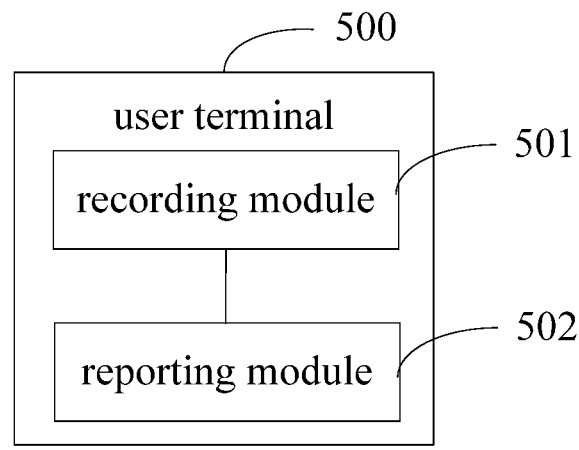
FIG. 5 is a schematic diagram of a user terminal according to some embodiments of the present disclosure.

Referring to FIG. 5, FIG. 5 is a schematic diagram of a user terminal according to some embodiments of the present disclosure. As shown in FIG. 5, the user terminal 500 includes:

a recording module 501 used to record radio link failure information of a radio link failure that occurs in the user terminal;

a reporting module 502 used to report the radio link failure information to a network device when the user terminal enters a connected state or an inactive state in a current cell.

Optionally, the reporting module 502 is used to report the radio link failure information to the network device in a radio resource control (RRC) connection procedure or an RRC resume procedure when the user terminal enters the connected state or the inactive state in the current cell.

The reporting module 502 is used to report the radio link failure information to the network device after the RRC connection procedure or the RRC resume procedure when the user terminal enters the connected state or the inactive state in the current cell.

Optionally, the current cell and the cell where the radio link failure occurs, are an identical cell, or, the current cell and the cell where the radio link failure occurs, are different cells of the same network; or, the current cell and the cell where the radio link failure occurs, are cells of different networks.

Optionally, the radio link failure information includes at least one of cell identifier information, power information, measurement information, received signal strength indication (RSSI) information, basic service set (BSS) information, bluetooth beacon, location information, network slice information, time information and area information.

Optionally, the cell identifier information includes: identifier information of a reporting cell. The reporting cell includes at least one of a cell where the radio link failure occurs, and a cell adjacent the cell where the radio link failure occurs.

The power information includes power headroom (PH).

The measurement information includes at least one of measurement information of synchronization signal block (SS block) of the reporting cell, measurement information of channel condition information reference signal (CSI-RS), measurement information of tracking reference signal (TRS), and phase-tracking reference signal (PTRS).

The RSSI information includes RSSI information of the reporting cell.

The BSS information includes BSS information of the reporting cell.

The location information includes location information where a radio link failure occurs.

The network slice information includes information of network slice in which a radio link failure occurs.

The time information includes at least one of time information of radio link failure and time information of resuming radio link.

The area information includes at least one of RAN notification area (RNA) information, RAN paging area (RPA) information, RAN location area (RLA) information, system information area information and core network tracking area information.

Optionally, the measurement information of the SS block may include at least one of signal to interference plus noise ratio (SINR) of the SS block, reference signal receiving power (RSRP), reference signal receiving quality (RSRQ), measurement information of primary synchronization signal (PSS), measurement information of secondary synchronization signal (SSS) and measurement information of physical broadcast channel (PBCH).

The measurement information of CSI-RS includes at least one of SINR, RSRP and RSRQ of the CSI-RS.

Optionally, the measurement information of the PSS may include: beam information of the PSS.

The measurement information of the SSS includes beam information of the SSS.

The measurement information of the PBCH includes at least one of demodulation reference signal (DMRS) measurement information and beam information of the PBCH.

The user terminal provided in some embodiments of the present disclosure can implement various processes implemented by the user terminal in the method embodiments of FIG. 2 to FIG. 3, and the details are not described herein again, and the communication performance of the communication system can be improved.

Figure 6:
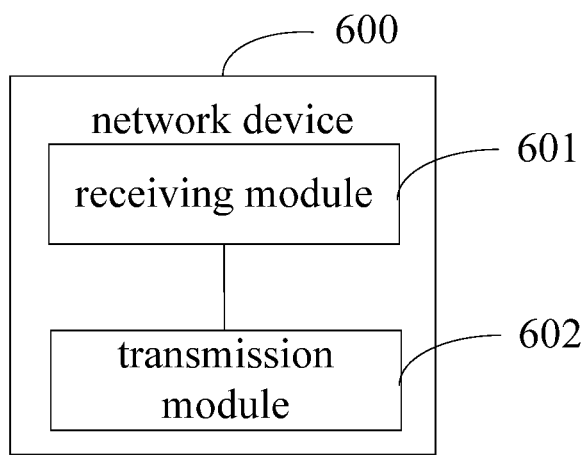
FIG. 6 is a schematic diagram of a network device according to some embodiments of the present disclosure.

Referring to FIG. 6, FIG. 6 is a schematic diagram of a network device according to some embodiments of the present disclosure. As shown in FIG. 6, the network device 600 includes:

a receiving module 601 used to receive radio link failure information transmitted by a user terminal in a current cell;

a transmission module 602 used to, when the current cell is different from a cell where the radio link failure of the user terminal occurs, transmit the radio link failure information to a network device of the cell where the radio link failure occurs.

Optionally, the receiving module 601 is used to receive the radio link failure information transmitted by the user terminal in an RRC connection procedure or an RRC resume procedure of the user terminal; or, the receiving module 601 is used to receive the radio link failure information transmitted by the user terminal after the RRC connection procedure or the RRC resume procedure.

The RRC connection procedure or the RRC resume procedure may be an RRC connection procedure or an RRC resume procedure of the user terminal in the current cell.

Optionally, the current cell and the cell where the radio link failure occurs, are different cells of the same network; or, the current cell and the cell where the radio link failure occurs, are cells of different networks.

Optionally, the transmission module 602 is used to, when the current cell is different from the cell where the radio link failure of the user terminal occurs, transmit in wired or wireless manner, the radio link failure information to the network device of the cell where the radio link failure occurs; or, the transmission module 602 is used to, when the current cell is different from the cell where the radio link failure of the user terminal occurs, transmit through a relay network device, the radio link failure information to the network device of the cell where the radio link failure occurs.

Optionally, the radio link failure information includes at least one of cell identifier information, power information, measurement information, received signal strength indication (RSSI) information, basic service set (BSS) information, bluetooth beacon, location information, network slice information, time information and area information.

Optionally, the cell identifier information includes: identifier information of a reporting cell. The reporting cell includes at least one of a cell where the radio link failure occurs, and a cell adjacent the cell where the radio link failure occurs.

The power information includes power headroom (PH).

The measurement information includes at least one of measurement information of synchronization signal block (SS block) of the reporting cell, measurement information of channel condition information reference signal (CSI-RS), measurement information of tracking reference signal (TRS), and phase-tracking reference signal (PTRS).

The RSSI information includes RSSI information of the reporting cell.

The BSS information includes BSS information of the reporting cell.

The location information includes location information where a radio link failure occurs.

The network slice information includes information of network slice in which a radio link failure occurs.

The time information includes at least one of time information of radio link failure and time information of resuming radio link.

The area information includes at least one of RAN notification area (RNA) information, RAN paging area (RPA) information, RAN location area (RLA) information, system information area information and core network tracking area information.

Optionally, the measurement information of the SS block may include at least one of signal to interference plus noise ratio (SINR) of the SS block, reference signal receiving power (RSRP), reference signal receiving quality (RSRQ), measurement information of primary synchronization signal (PSS), measurement information of secondary synchronization signal (SSS) and measurement information of physical broadcast channel (PBCH).

The measurement information of CSI-RS includes at least one of SINR, RSRP and RSRQ of the CSI-RS.

Optionally, the measurement information of the PSS may include: beam information of the PSS.

The measurement information of the SSS includes beam information of the SSS.

The measurement information of the PBCH includes at least one of demodulation reference signal (DMRS) measurement information and beam information of the PBCH.

The base station provided in some embodiments of the present disclosure can implement various processes implemented by the base station in the method embodiments of FIG. 4, and the details are not described herein again, and the communication performance of the communication system can be improved.

Figure 7:
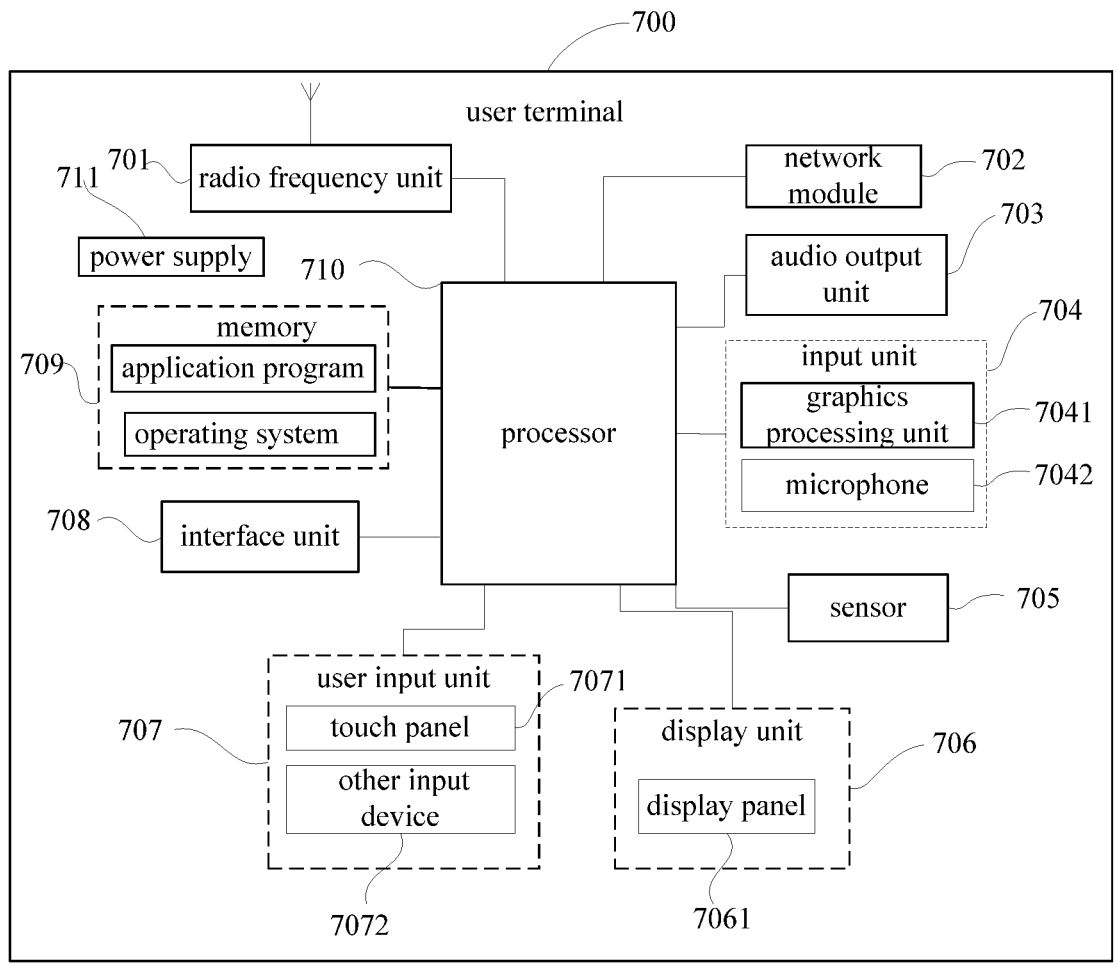
FIG. 7 is another schematic diagram of a user terminal according to some embodiments of the present disclosure.

FIG. 7 is a schematic diagram of a hardware structure of a user terminal according to some embodiments of the present disclosure.

The user terminal 700 includes, but is not limited to, a radio frequency unit 701, a network module 702, an audio output unit 703, an input unit 704, a sensor 705, a display unit 706, a user input unit 707, an interface unit 708, a memory 709, a processor 710, and a power supply 711. It will be appreciated by those skilled in the art that structures of the user terminal shown in FIG. 7 do not constitute a definition of a user terminal, which may include more or fewer components than illustrated, or have some components combined, or different component arrangements. In one embodiment of the present disclosure, the user terminal includes, but is not limited to, a mobile phone, a tablet computer, a notebook computer, a palmtop computer, an in-vehicle terminal, a wearable device, a pedometer, and the like.

The processor 710 is used to record radio link failure information of a radio link failure that occurs in a user terminal;

The radio frequency unit 701 is used to report the radio link failure information to a network device when the user terminal enters a connected state or an inactive state in a current cell.

Optionally, when reporting the radio link failure information to the network device, the radio frequency unit 701 is used to, report the radio link failure information to the network device in a radio resource control (RRC) connection procedure or an RRC resume procedure; or, report the radio link failure information to the network device after the RRC connection procedure or the RRC resume procedure.

Optionally, the current cell and the cell where the radio link failure occurs, are an identical cell, or, the current cell and the cell where the radio link failure occurs, are different cells of the same network; or, the current cell and the cell where the radio link failure occurs, are cells of different networks.

Optionally, the radio link failure information includes at least one of cell identifier information, power information, measurement information, received signal strength indication (RSSI) information, basic service set (BSS) information, bluetooth beacon, location information, network slice information, time information and area information.

Optionally, the cell identifier information includes: identifier information of a reporting cell. The reporting cell includes at least one of a cell where the radio link failure occurs, and a cell adjacent the cell where the radio link failure occurs.

The power information includes power headroom (PH).

The measurement information includes at least one of measurement information of synchronization signal block (SS block) of the reporting cell, measurement information of channel condition information reference signal (CSI-RS), measurement information of tracking reference signal (TRS), and phase-tracking reference signal (PTRS).

The RSSI information includes RSSI information of the reporting cell.

The BSS information includes BSS information of the reporting cell.

The location information includes location information where a radio link failure occurs.

The network slice information includes information of network slice in which a radio link failure occurs.

The time information includes at least one of time information of radio link failure and time information of resuming radio link.

The area information includes at least one of RAN notification area (RNA) information, RAN paging area (RPA) information, RAN location area (RLA) information, system information area information and core network tracking area information.

Optionally, the measurement information of the SS block may include at least one of signal to interference plus noise ratio (SINR) of the SS block, reference signal receiving power (RSRP), reference signal receiving quality (RSRQ), measurement information of primary synchronization signal (PSS), measurement information of secondary synchronization signal (SSS) and measurement information of physical broadcast channel (PBCH).

The measurement information of CSI-RS includes at least one of SINR, RSRP and RSRQ of the CSI-RS.

Optionally, the measurement information of the PSS may include: beam information of the PSS.

The measurement information of the SSS includes beam information of the SSS.

The measurement information of the PBCH includes at least one of demodulation reference signal (DMRS) measurement information and beam information of the PBCH.

The above user terminal 700 can improve the communication performance of the communication system.

It should be understood that in some embodiments of the present disclosure, the radio frequency unit 701 may be used to receive and transmit signals during receiving and transmitting information or a call. Specifically, the radio frequency unit 701 receives downlink data from a base station and then transmits the downlink data to the processor 710 for processing. Uplink data is transmitted to the base station. Generally, the radio frequency unit 701 includes, but is not limited to, an antenna, at least one amplifier, a transceiver, a coupler, a low noise amplifier, a duplexer, and the like. In addition, the radio frequency unit 701 may also communicate with the network and other devices through a wireless communication system.

The user terminal provides wireless broadband internet access to the user through the network module 702, such as assisting the user in receiving and transmitting email, browsing web pages, and accessing streaming media.

The audio output unit 703 may convert the audio data received by the radio frequency unit 701 or the network module 702 or stored in the memory 709 into an audio signal and output as sound. Moreover, the audio output unit 703 may also provide audio output (e.g., call signal reception sound, message reception sound, etc.) related to a specific function performed by the user terminal 700. The audio output unit 703 includes a speaker, a buzzer, a receiver, and the like.

The input unit 704 is used for receiving an audio or video signal. The input unit 704 may include a Graphics Processing Unit (GPU) 7041 and a microphone 7042. The GPU 7041 processes image data of static pictures or videos obtained by an image capturing apparatus (such as a camera) in a video capturing mode or an image capturing mode. The processed image frame may be displayed on the display unit 706. The image frames processed by the graphics processor 7041 may be stored in the memory 709 (or other storage medium) or transmitted via the radio frequency unit 701 or the network module 702. The microphone 7042 can receive sound and can process such sound into audio data. The processed audio data may be converted into a format output that may be transmitted to the mobile communication base station via the radio frequency unit 701 in the case of a telephone talk mode.

The user terminal 700 further includes at least one sensor 705, such as a light sensor, a motion sensor, and other sensors. Specifically, the light sensor includes an ambient light sensor and a proximity sensor. The ambient light sensor can adjust brightness of a display panel 7061 according to the brightness of the ambient light. The proximity sensor can turn off the display panel 7061 and/or backlight when the user terminal 700 moves to the ear. As one of the motion sensors, an accelerometer sensor can detect the magnitude of the acceleration in each direction (generally three axes), can detect the magnitude and direction of the gravity when stationary, and can be used to identify the attitude of the user terminal (such as horizontal/vertical screen switching, related games, magnetometer attitude calibration), vibration identification related functions (such as pedometer, knocking), and the like. The sensor 705 may further include a fingerprint sensor, a pressure sensor, an iris sensor, a molecular sensor, a gyroscope, a barometer, a hygrometer, a thermometer, an infrared sensor, and the like, which will not be elaborated herein.

The display unit 706 is used to display information input by or provided to the user. The display unit 706 may include a display panel 7061, which may be configured in the form of a Liquid Crystal Display (LCD), an Organic Light-Emitting Diode (OLED), or the like.

The user input unit 707 may be used to receive the input number or character information, and to generate a key signal input related to the user setting and the function control of the user terminal. Specifically, the user input unit 707 includes a touch panel 7071 and other input devices 7072. The touch panel 7071, also referred to as a touch screen, may collect touch operations on or near the touch panel (e.g., operations on or near the touch panel 7071 using any suitable object or accessory, such as a finger, stylus, or the like). The touch panel 7071 may include a touch detection device and a touch controller. The touch detection device detects a touch orientation of the user, detects a signal generated by the touch operation, and transmits the signal to the touch controller. The touch controller receives touch information from the touch detection device and converts it into contact coordinates, which are then transmitted to the processor 710, receives commands from the processor 710 and execute them. In addition, the touch panel 7071 may be implemented in various types such as a resistive type, a capacitive type, an infrared ray, and a surface acoustic wave. In addition to the touch panel 7071, the user input unit 707 may further include other input devices 7072. Specifically, other input devices 7072 may include, but are not limited to, a physical keyboard, a function key (such as a volume control key, an on-off key), a trackball, a mouse, and a joystick, which will not be elaborated herein.

Further, the touch panel 7071 may be overlaid on the display panel 7061. When the touch panel 7071 detects a touch operation on or near the touch panel, the touch panel 7071 transmits it to the processor 710 to determine a type of a touch event. Then, the processor 710 provides a corresponding visual output on the display panel 7061 according to the type of the touch event. Although in FIG. 7, the touch panel 7071 and the display panel 7061 are implemented as two separate components to implement the input and output functions of the user terminal, in some embodiments, the touch panel 7071 and the display panel 7061 may be integrated to implement the input and output functions of the user terminal, which are not specifically limited herein.

The interface unit 708 is an interface through which an external device is connected to the user terminal 700. For example, the external device may include a wired or wireless headset port, an external power (or battery charger) port, a wired or wireless data port, a memory card port, a port for connecting a device having an identification module, an audio input/output (I/O) port, a video I/O port, a headset port, and the like. The interface unit 708 may be used to receive input (e.g., data information, power, etc.) from the external device and transmit the received input to one or more elements within the user terminal 700 or may be used to transmit data between the user terminal 700 and the external device.

The memory 709 may be used to store software programs and various data. The memory 709 may mainly include a program storage area and a data storage area. The program storage area may store an operating system, an application program (such as a sound play function, an image play function) required by at least one function, and the like. The data storage area may store data (such as audio data, a phone book) created according to use of the user terminal. In addition, the memory 709 may include high speed random access memory, and may also include non-volatile memory, such as at least one magnetic disk storage device, flash memory device, or other volatile solid state storage device.

The processor 710 is a control center of the user terminal, connects various parts of the entire user terminal by various interfaces and lines, executes various functions of the user terminal and processes data by running or executing software programs and/or modules stored in the memory 709 and invoking data stored in the memory 709, thereby performing overall monitoring of the user terminal. The processor 710 may include one or more processing units. Optionally, the processor 710 may integrate an application processor and a modem processor. The application processor primarily processes the operating system, the user interface and the application program. The modem processor primarily processes wireless communications. It will be appreciated that the modem processor may also not be integrated into the processor 710.

The user terminal 700 may further include a power source 711 (such as a battery) that supplies power to the various components. Optionally, the power source 711 may be logically connected to the processor 710 through a power management system to perform functions such as managing charging, discharging, and power consumption management through the power management system.

In addition, the user terminal 700 includes functional modules not shown, which will not be elaborated herein.

Optionally, one embodiment of the present disclosure further provides a user terminal including a processor 710, a memory 709, and a computer program stored in the memory 709 and executable on the processor 710. When the computer program is executed by the processor 710, each of the processes in the method of processing radio link failure of the above embodiment is implemented, and the same technical effect can be achieved. To avoid repetition, details are not described herein.

Figure 8:
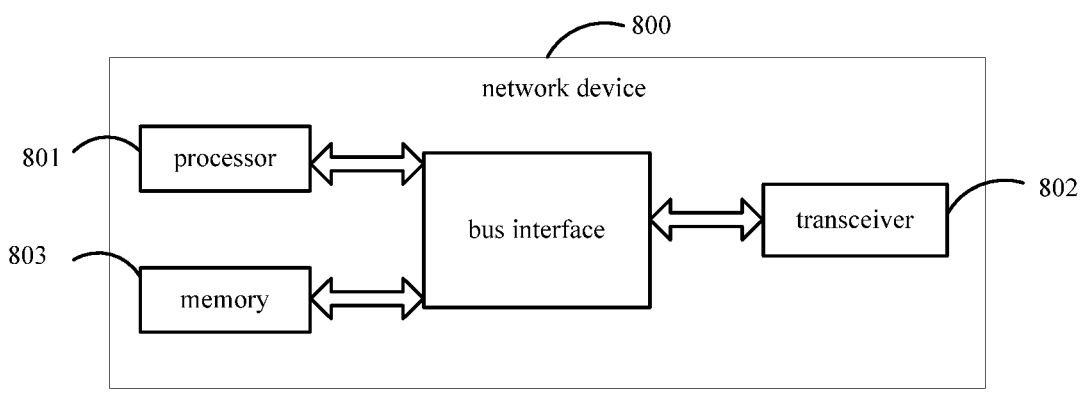
FIG. 8 is another schematic diagram of a network device according to some embodiments of the present disclosure.

Referring to FIG. 8, FIG. 8 is another schematic diagram of a network device according to some embodiments of the present disclosure. As shown in FIG. 8, the network device 800 includes: a processor 801, a transceiver 802, a memory 803, and a bus interface.

The transceiver 802 is used to receive radio link failure information transmitted by a user terminal in a current cell; when the current cell is different from a cell where the radio link failure of the user terminal occurs, transmit the radio link failure information to a network device of the cell where the radio link failure occurs.

Optionally, when receiving the radio link failure information transmitted by the user terminal in the current cell, the transceiver 802 is used to, receive the radio link failure information transmitted by the user terminal in an RRC connection procedure or an RRC resume procedure of the user terminal; or, receive the radio link failure information transmitted by the user terminal after the RRC connection procedure or the RRC resume procedure.

The RRC connection procedure or the RRC resume procedure may be an RRC connection procedure or an RRC resume procedure of the user terminal in the current cell.

Optionally, the current cell and the cell where the radio link failure occurs, are different cells of the same network; or, the current cell and the cell where the radio link failure occurs, are cells of different networks.

Optionally, when transmitting the radio link failure information to the network device of the cell where the radio link failure occurs, the transceiver 802 is used to, transmit in wired or wireless manner, the radio link failure information to the network device of the cell where the radio link failure occurs; or, transmit through a relay network device, the radio link failure information to the network device of the cell where the radio link failure occurs.

Optionally, the radio link failure information includes at least one of cell identifier information, power information, measurement information, received signal strength indication (RSSI) information, basic service set (BSS) information, bluetooth beacon, location information, network slice information, time information and area information.

Optionally, the cell identifier information includes: identifier information of a reporting cell. The reporting cell includes at least one of a cell where the radio link failure occurs, and a cell adjacent the cell where the radio link failure occurs.

The power information includes power headroom (PH).

The measurement information includes at least one of measurement information of synchronization signal block (SS block) of the reporting cell, measurement information of channel condition information reference signal (CSI-RS), measurement information of tracking reference signal (TRS), and phase-tracking reference signal (PTRS).

The RSSI information includes RSSI information of the reporting cell.

The BSS information includes BSS information of the reporting cell.

The location information includes location information where a radio link failure occurs.

The network slice information includes information of network slice in which a radio link failure occurs.

The time information includes at least one of time information of radio link failure and time information of resuming radio link.

The area information includes at least one of RAN notification area (RNA) information, RAN paging area (RPA) information, RAN location area (RLA) information, system information area information and core network tracking area information.

Optionally, the measurement information of the SS block may include at least one of signal to interference plus noise ratio (SINR) of the SS block, reference signal receiving power (RSRP), reference signal receiving quality (RSRQ), measurement information of primary synchronization signal (PSS), measurement information of secondary synchronization signal (SSS) and measurement information of physical broadcast channel (PBCH).

The measurement information of CSI-RS includes at least one of SINR, RSRP and RSRQ of the CSI-RS.

Optionally, the measurement information of the PSS may include: beam information of the PSS.

The measurement information of the SSS includes beam information of the SSS.

The measurement information of the PBCH includes at least one of demodulation reference signal (DMRS) measurement information and beam information of the PBCH.

The network device 800 can improve the communication performance of the communication system.

The transceiver 802 is used to receive and transmit data under the control of the processor 801. The transceiver 802 includes at least two antenna ports.

In FIG. 8, a bus architecture may include any number of interconnected buses and bridges. Specifically, various circuits of one or more processors, which are represented by the processor 801, and the storage, which is represented by the memory 803, are linked together. The bus architecture may link various other circuits, such as a peripheral device, voltage regulator and a power management circuit together. These features are well known in this field, therefore, this disclosure does not make further description on these features. The bus interface provides an interface. The transceiver 802 may be multiple elements, including a transmitter and a receiver and provide units, which communicate with other devices on the transmission medium. For different UEs, a user interface 804 may also be an interface capable of externally/internally connecting required devices which may include a keyboard, a monitor, a speaker, microphone, joystick.

The processor 801 is responsible for managing the bus architecture and common processing and the memory 803 may store data used by the processor 801 when executing the operations.

Optionally, one embodiment of the present disclosure further provides a network device including a processor 801, a memory 803, and a computer program stored in the memory 803 and executable on the processor 801. When the computer program is executed by the processor 801, each of the processes in the method of processing radio link failure of the above embodiment is implemented, and the same technical effect can be achieved. To avoid repetition, details are not described herein.

One embodiment of the present disclosure further provides a computer readable storage medium including a computer program stored thereon. The computer program is executed by a processor to implement each process of the above method of processing radio link failure at the user terminal, or, the computer program is executed by a processor to implement each process of the above method of processing radio link failure at the network device, and the same technical effect can be achieved. To avoid repetition, details are not described herein. The computer readable storage medium may be a volatile memory or a non-volatile memory, or may include both volatile and non-volatile memory, such as a read-only memory (ROM), a random access memory (RAM), a magnetic disk, or an optical disk.

It is to be noted that terms "comprise", "include" or any other variations are intended to encompass a non-exclusive inclusion, such that a process, method, system, commodity, or device that include a series of steps or elements include not only those steps or elements but also other steps or elements that are not explicitly listed, or steps or elements that are inherent to such process, method, commodity, or device. An element defined by the phrase "comprising a . . . " does not exclude the presence of additional equivalent elements in the process, method, commodity, or device including the element.

From the above description of the embodiments, it will be apparent to those skilled in the art that the method of the above embodiments may be implemented by means of software plus the necessary general hardware platform, but may be implemented by means of hardware, but in many cases the former is the preferred embodiment. Based on such an understanding, the technical solution of the present disclosure, in essence or in part contributing to the related art, may be embodied in the form of a software product stored in a storage medium (such as a ROM/RAM, a magnetic disk, or an optical disk) including instructions for causing a terminal (which may be a mobile phone, a computer, a server, an air conditioner, or a network device) to perform the methods described in the various embodiments of the present disclosure.

The embodiments of the present disclosure have been described above in conjunction with the accompanying drawings, but the present disclosure is not limited to the specific embodiments described above. The specific embodiments described above are merely illustrative and not restrictive, and those of ordinary skill in the art will be able to make many forms without departing from the spirit of the disclosure and the scope of the claims, all of which fall within the protection of the disclosure.

What is claimed is:

1. A method of processing radio link failure, performed by a user terminal, comprising:
    recording radio link failure information of a cell where a radio link failure of the user terminal occurs;
    when the user terminal enters a connected state or an inactive state in a current cell, reporting the radio link failure information to a network device;
    wherein the radio link failure information comprises:
    received signal strength indication (RSSI) information and bluetooth beacon.

2. The method according to claim 1, wherein the reporting the radio link failure information to a network device, comprises:
    reporting the radio link failure information to the network device in a radio resource control (RRC) connection procedure or an RRC resume procedure; or,
    reporting the radio link failure information to the network device after the RRC connection procedure or the RRC resume procedure.

3. The method according to claim 1, wherein the current cell and a cell where the radio link failure occurs, are an identical cell, or,
    the current cell and the cell where the radio link failure occurs, are different cells of the same network; or,
    the current cell and the cell where the radio link failure occurs, are cells of different networks.

4. The method according to claim 1, wherein the radio link failure information further comprises at least one of cell identifier information, power information, measurement information, location information, network slice information, time information and area information.

5. The method according to claim 4, wherein the cell identifier information comprises identifier information of a reporting cell; the reporting cell comprises at least one of a cell where the radio link failure occurs, and a cell adjacent the cell where the radio link failure occurs;
    the measurement information comprises at least one of measurement information of synchronization signal block (SS block) of the reporting cell, measurement information of channel condition information reference signal (CSI-RS), measurement information of tracking reference signal (TRS), and phase-tracking reference signal (PTRS);
    the area information comprises at least one of RAN notification area (RNA) information, RAN paging area (RPA) information, RAN location area (RLA) information, system information area information and core network tracking area information.

6. A method of processing radio link failure, performed by a network device, comprising:
    receiving radio link failure information transmitted by a user terminal in a current cell;
    when the current cell is different from a cell where the radio link failure of the user terminal occurs, transmitting the radio link failure information to a network device of the cell where the radio link failure occurs;
    wherein the radio link failure information comprises:
    received signal strength indication (RSSI) information and bluetooth beacon.

7. The method according to claim 6, wherein the receiving radio link failure information transmitted by a user terminal in a current cell, comprises:
    receiving the radio link failure information transmitted by the user terminal in an RRC connection procedure or an RRC resume procedure of the user terminal; or,
    receiving the radio link failure information transmitted by the user terminal after the RRC connection procedure or the RRC resume procedure;
    wherein the RRC connection procedure or the RRC resume procedure is an RRC connection procedure or an RRC resume procedure of the user terminal in the current cell.

8. The method according to claim 6, wherein the current cell and the cell where the radio link failure occurs, are different cells of the same network; or,
    the current cell and the cell where the radio link failure occurs, are cells of different networks.

9. The method according to claim 6, wherein the transmitting the radio link failure information to a network device of the cell where the radio link failure occurs, comprises:
    transmitting in wired or wireless manner, the radio link failure information to the network device of the cell where the radio link failure occurs; or,
    transmitting through a relay network device, the radio link failure information to the network device of the cell where the radio link failure occurs.

10. The method according to claim 6, wherein the radio link failure information comprises at least one of cell identifier information, power information, measurement information, location information, network slice information, time information and area information.

11. The method according to claim 10, wherein the cell identifier information comprises identifier information of a reporting cell; the reporting cell comprises at least one of a cell where the radio link failure occurs, and a cell adjacent the cell where the radio link failure occurs;
    the measurement information comprises at least one of measurement information of synchronization signal block (SS block) of the reporting cell, measurement information of channel condition information reference signal (CSI-RS), measurement information of tracking reference signal (TRS), and phase-tracking reference signal (PTRS);
    the area information comprises at least one of RAN notification area (RNA) information, RAN paging area (RPA) information, RAN location area (RLA) information, system information area information and core network tracking area information.

12. A user terminal comprising:
    a memory, a processor, and a computer program stored on the memory and executable on the processor; wherein when the computer program is executed by the processor, the processor is used to implement steps of the method according to claim 1.

13. The user terminal according to claim 12, wherein the processor is used to,
report the radio link failure information to the network device in a radio resource control (RRC) connection procedure or an RRC resume procedure; or,
report the radio link failure information to the network device after the RRC connection procedure or the RRC resume procedure.

14. The user terminal according to claim 12, wherein the current cell and a cell where the radio link failure occurs, are an identical cell, or,
the current cell and the cell where the radio link failure occurs, are different cells of the same network; or,
the current cell and the cell where the radio link failure occurs, are cells of different networks.

15. The user terminal according to claim 12, wherein the radio link failure information further comprises at least one of cell identifier information, power information, measurement information, location information, network slice information, time information and area information.

16. The user terminal according to claim 15, wherein the cell identifier information comprises identifier information of a reporting cell; the reporting cell comprises at least one of a cell where the radio link failure occurs, and a cell adjacent the cell Where the radio link failure occurs;
the measurement information comprises at least one of measurement information of synchronization signal block (SS block) of the reporting cell, measurement information of channel condition information reference signal (CSI-RS), measurement information of tracking reference signal (TRS), and phase-tracking reference signal (PTRS);
the area information comprises at least one of RAN notification area (RNA) information, RAN paging area (RPA) information, RAN location area (RLA) information, system information area information and core network tracking area information.

17. A network device comprising:
a memory, a processor, and a computer program stored on the memory and executable on the processor; wherein when the computer program is executed by the processor, the processor is used to implement steps of the method according to claim 6.

18. The network device according to claim 17, wherein the processor is used to,
receive the radio link failure information transmitted by the user terminal in an RRC connection procedure or an RRC resume procedure of the user terminal; or,
receive the radio link failure information transmitted by the user terminal after the RRC connection procedure or the RRC resume procedure;
wherein the RRC connection procedure or the RRC resume procedure is an RRC connection procedure or an RRC resume procedure of the user terminal in the current cell.

19. The network device according to claim 17, wherein the current cell and the cell where the radio link failure occurs, are different cells of the same network; or,
the current cell and the cell where the radio link failure occurs, are cells of different networks.

20. A network device comprising:
a processor, a transceiver, and a bus interface; wherein the processor and the transceiver are coupled with other by the bus interface;
the transceiver is used to, under control of the processor,
receive radio link failure information transmitted by a user terminal in a current cell;
when the current cell is different from a cell where the radio link failure of the user terminal occurs, transmit the radio link failure information to a network device of the cell where the radio link failure occurs;
wherein the radio link failure information comprises:
received signal strength indication (RSSI) information and Bluetooth beacon.

* * * * *